(12) United States Patent
Ma et al.

(10) Patent No.: US 11,614,464 B2
(45) Date of Patent: Mar. 28, 2023

(54) SYSTEM FOR SIMULTANEOUSLY AND MICROSCOPICALLY MEASURING VAPOR CELL COATING FILM ENERGY TRANSFER AND RELAXATION CHARACTERISTICS AT NANOMETER SCALES

(71) Applicant: North University of China, Taiyuan (CN)

(72) Inventors: Zongmin Ma, Taiyuan (CN); Jun Liu, Taiyuan (CN); Jun Tang, Taiyuan (CN); Yunbo Shi, Taiyuan (CN); Xiaoming Zhang, Taiyuan (CN); Hao Guo, Taiyuan (CN); Huanfei Wen, Taiyuan (CN); Cheng Dong, Taiyuan (CN); Jiuyan Wei, Taiyuan (CN)

(73) Assignee: North University of China, Taiyuan (CN)

( * ) Notice: Subject to any disclaimer, the term of this patent is extended or adjusted under 35 U.S.C. 154(b) by 0 days.

(21) Appl. No.: 17/546,532

(22) Filed: Dec. 9, 2021

(65) Prior Publication Data
US 2022/0196700 A1 Jun. 23, 2022

(30) Foreign Application Priority Data
Dec. 23, 2020 (CN) .......................... 202011539396.9

(51) Int. Cl.
*G01Q 60/24* (2010.01)
*G01N 21/01* (2006.01)
*G01N 21/84* (2006.01)

(52) U.S. Cl.
CPC ............. *G01Q 60/24* (2013.01); *G01N 21/01* (2013.01); *G01N 21/84* (2013.01)

(58) Field of Classification Search
CPC ......... G01Q 60/24; G01N 21/01; G01N 21/84
USPC ........................................................ 850/33
See application file for complete search history.

(56) References Cited

U.S. PATENT DOCUMENTS

| | | | | |
|---|---|---|---|---|
| 9,392,957 | B1* | 7/2016 | Halpern | G01R 33/60 |
| 9,945,914 | B2* | 4/2018 | Hwang | G01R 33/60 |
| 10,845,382 | B2* | 11/2020 | Su | G01Q 30/02 |
| 2020/0287343 | A1* | 9/2020 | Kubo | H03F 3/19 |
| 2021/0048414 | A1* | 2/2021 | Gardinier | A61K 47/6923 |
| 2022/0065672 | A1* | 3/2022 | O'Neill | G01R 33/445 |

* cited by examiner

*Primary Examiner* — Nicole M Ippolito
(74) *Attorney, Agent, or Firm* — Leason Ellis LLP

(57) ABSTRACT

A system for simultaneously and microscopically measuring vapor cell coating film energy transfer and relaxation characteristics at nanometer scales includes a space relaxation characteristic detection unit which includes a laser, an optical isolator, a spatial light filter, a reflector, a Glan-Taylor polarizer, a first quarter-wave plate, a spatial light modulator, a focusing lens, a second quarter-wave plate, a polarizing film, a PD detection unit, an I/V amplification unit, a data acquisition unit, a spectroscope and an optical chopper, an atomic force microscope detection unit for energy transfer micro-areas, a shielding cylinder, a coated alkali metal atomic vapor cell, a data processing unit and a magnetic field controlled coil. The energy transfer micro-area detection unit includes coated samples, a probe, an oscillator, a laser, a four-quadrant photoelectric detection unit, a band-pass filter unit, an automatic gain controller, an adder, a piezoelectric scanning cylinder, a sample table and a PI controller.

8 Claims, 3 Drawing Sheets

SYSTEM FOR SIMULTANEOUSLY AND MICROSCOPICALLY MEASURING VAPOR CELL COATING FILM ENERGY TRANSFER AND RELAXATION CHARACTERISTICS AT NANOMETER SCALES

CROSS REFERENCE TO RELATED APPLICATION

This patent application claims the benefit and priority of Chinese Patent Application No. 202011539396.9, entitled "System for Simultaneously and Microscopically Measuring Vapor Cell Coating Film Energy transfer and Relaxation Characteristics At Nanometer Scales" filed on Dec. 23, 2020, the disclosure of which is incorporated by reference herein in its entirety as part of the present application.

TECHNICAL FIELD

The present disclosure relates to the field of quantum sensing, further relates to an atomic vapor cell, and specifically relates to a system for simultaneously and microscopically measuring vapor cell coating film energy transfer and relaxation characteristics at nanometer scales.

BACKGROUND ART

At present, there are no recognized standard method for the characterization of vapor cell coating film in the educational circles. The anti-relaxation mechanism interpretation of the coating film is mainly based on guessing and is not supported by reliable microcosmic representation. Therefore, enough theoretical guidance is lacked for anti-relaxation characteristic improvement of the vapor cell coating film and the process improvement thereof at present.

At present, the microscopic characterization research of an anti-relaxation coating film is carried out at home and abroad. On one hand, indexes such as roughness, film thickness and elastic collision energy exchange of the anti-relaxation coating film are subjected to microscopic characterization through scanning probe microscopy and spectrum technologies; on the other hand, the overall relaxation time of alkali metal atoms in the vapor cell is measured by the free induction decay (FID) of the atoms and a bisection method. Because in the existing research, the representation result of the surface state of the coating film cannot corresponds to the anti-relaxation characteristic of the coating film, so the relaxation mechanism can only be guessed according to two-dimensional data measured based on the surface state and single-point data of the overall relaxation time.

According to the present disclosure, the nano-scale characterization correlation between the vapor cell coating film surface characteristic and the anti-relaxation characteristic is established, and the internal mechanism of the anti-relaxation characteristic of the atomic vapor cell coating film is disclosed, so as to improve the detection performance of quantum sensors.

SUMMARY

The system solves the problems that the current characterization technology is incompatible and synchronous micro-area measurement of the same sample cannot be realized. According to the scheme, atomic force microscope measurement and atomic spin polarizability two-dimensional characterization are organically combined. Simultaneous and microscopic measurement of force and light in vapor cell coating film collision energy transfer and relaxation process at nanometer scales is realized, so as to complete synchronous and corresponding measurement of the coating film surface state and anti-relaxation characteristic micro-area characterization.

According to the system, integrated sealing and integration of a probe, a coating film and alkali metal gas are realized by designing and manufacturing an atomic vapor cell. Spatial relaxation characteristic detection for the vapor cell coating is realized through a spatial-distribution pulsed magnetic microscopy technology with space-time dual modulation. The multi-eigen frequency high-stability excitation and collision detection of the probe are realized through the first-order and high-order vibration frequency modulation technologies of automatic gain control following closed-loop control. Specifically, the system is realized through the following technical scheme. The system for simultaneously and microscopically measuring vapor cell coating film energy transfer and relaxation characteristics at nanometer scales includes a space relaxation characteristic detection unit, a shielding cylinder, a coated alkali-metal atomic vapor cell, a data processing unit and a magnetic field controlled coil. The space relaxation characteristic detection unit includes a relaxation laser, an optical isolator, a spatial light filter, a reflector, a Glan-Taylor polarizer, a first quarter-wave plate, a spatial light modulator, a focusing lens, a second quarter-wave plate, a polarizing film, a PD detection unit, an I/V amplification unit, a data acquisition unit, a beam-splitting plate, pumping reflectors and an optical chopper. During detection, the coated alkali-metal atomic vapor cell and the magnetic field controlled coils are arranged in the shielding cylinder. The magnetic field controlled coils are configured to eliminate residual magnetism in the shielding cylinder. Alkali-metal vapor and coated samples are provided in the coated alkali-metal atomic vapor cell. A light beam emitted from the relaxation laser is divided into two light paths by the beam-splitting plate through the optical isolator. The spatial light filter and the reflector, one path of the two light paths serves as pump light to penetrate through a first light-through hole in the shielding cylinder after passing through the pumping reflectors and the optical chopper and enters the coated alkali-metal atomic vapor cell to excite alkali metal and generate spin polarization. On and off of the one path as the pump light are controlled by controlling the optical chopper. After the pump light is cut off, the other path of the two light paths serves as detection light to be subjected to pretreatment through the Glan-Taylor polarizer, the first quarter-wave plate and the spatial light modulator, penetrates through the first light-through hole in the shielding cylinder and enters the coated alkali-metal atomic vapor cell. An outgoing light beam comes out of the second light-through hole in another side of the shielding cylinder and sequentially passes through the focusing lens, the quarter-wave plate, the polarizing film and the PD detection unit. Spin relaxation information of alkali metal atoms near the coating surface is detected by PD detection unit. The spin relaxation information is acquired by the I/V amplification unit and the data acquisition unit and input into the data processing unit. The relaxation time is calculated by the data processing unit. The magnetic field controlled coils are configured for eliminating residual magnetism in the shielding cylinder.

According to the system for simultaneously and microscopically measuring vapor cell coating film energy transfer and relaxation characteristics at nanometer scales, the coated alkali-metal atomic vapor cell may include a top cover, an atomic vapor cell cavity, a gas outlet end, a gas inlet end, a rubber chamber bottom and gas valves. An upper portion of the atomic vapor cell cavity may be covered with the metal top cover. The rubber chamber bottom may be located at a bottom of the atomic vapor cell cavity. The gas outlet end and the gas inlet end may be arranged on the atomic vapor cell cavity. The gas valves may be arranged on the gas outlet end and the gas inlet end, respectively. The gas inlet end and the gas outlet end may be configured for feeding and discharging the alkaline metal gas. The gas valves may be configured for sealing the atomic vapor cell cavity. The gas inlet end and the gas outlet end on two sides of the atomic vapor cell cavity may be configured for introducing alkali metal gas into the atomic vapor cell. Gas valves are connected at pipeline ports. After alkali metal vapor is introduced into the atomic vapor cell, the gas valves are closed, so that an interior of the chamber body (i.e., the atomic vapor cell cavity) of the atomic vapor cell is completely sealed.

According to the system for simultaneously and microscopically measuring vapor cell coating film energy transfer and relaxation characteristics at nanometer scales, a rubber inner ring may be arranged on an inner periphery of the top cover. The rubber inner ring of the top cover may be configured to enhance gas tightness of the atomic vapor cell cavity.

The system for simultaneously and microscopically measuring vapor cell coating film energy transfer and relaxation characteristics at nanometer scales also comprises an atomic force microscope detection unit for energy transfer micro-areas. The atomic force microscope detection unit for energy transfer micro-areas may include a probe, a laser, an oscillator, a four-quadrant photoelectric detection unit, a band-pass filter unit, an automatic gain controller, an adder, a piezoelectric scanning cylinder, a sample table and a PI controller. The coated alkali-metal atomic vapor cell further may include a base. A transparent glass cover may be arranged in a middle of the top cover. The oscillator may be installed on an inner side of the top cover. The probe may be arranged at the end of the oscillator. The sample table may be installed on the rubber chamber bottom in the coated alkali-metal atomic vapor cell. During detection, the coated samples may be placed on the sample table. The piezoelectric scanning cylinder may be connected with one end of the base. Another end of the base is connected with the rubber chamber bottom. The PI controller may be connected with the piezoelectric scanning cylinder located in the shielding cylinder through a wiring hole in the shielding cylinder. The band-pass filter unit comprises a first-order band-pass filter unit and a second-order band-pass filter unit. The automatic gain controller may include a first-order automatic gain controller and a second-order automatic gain controller. The four-quadrant detector may be connected with the band-pass filter unit. The first-order band-pass filter unit may be connected with the first-order automatic gain controller. The two-order band-pass filter unit may be connected with the second-order automatic gain controller. The first-order automatic gain controller may be connected with the PI controller. The first-order automatic gain controller and the second-order automatic gain controller may be also connected with the adder. The adder may be connected with the oscillator through another wiring hole in the shielding cylinder. Laser emitted by the laser may irradiate a back face of the probe through another wiring hole in the shielding cylinder and the transparent glass cover and may reach the four-quadrant photoelectric detection unit after being reflected, Vibration information of the probe may be collected by the four-quadrant photoelectric detection unit and may include first-order detection information with frequency ($f_1$) and second-order detection information with frequency ($f_2$). The first-order detection information and the second-order detection information may respectively pass through the first-order band-pass filter unit and the second-order band-pass filter unit. A second-order detection signal may pass through the second-order automatic gain controller to obtain first two signals. One of the first two signals may obtain a first frequency shift signal ($\Delta f_2$)) related to collision, The first frequency shift signal ($\Delta f_2$) may be processed by the data processing unit to obtain energy transfer information. A first-order detection signal may pass through a first-order automatic gain controller to obtain second two signals. One of the second two signals may be a second frequency shift signal ($\Delta f_1$) and may be input into the piezoelectric scanning cylinder as a feedback signal after passing through the PI controller. The PI controller may control the piezoelectric scanning cylinder to move. The base may move along with the piezoelectric scanning cylinder. The base may drive the sample table to move. The probe may be close to or away from the coated samples through a movement of the sample table. Collision elasticity information of the probe and the coated samples may be obtained through the second frequency shift signal ($\Delta f_1$). The other signal of the first two signals of the second-order automatic gain controller served as a first feedback signal and the other signal of the second two signals of the first-order automatic gain controller served as a second feedback signal may be added in the adder and fed back to the probe oscillator to be served as a probe excitation signal. The probe may be excited to vibrate through the oscillator, the coated samples may be scanned, and surface topography information and energy transfer information may be obtained. The atomic force microscope detection unit for energy transfer micro-areas adopts the double-frequency modulation technology for achieving collision energy transfer measurement of the surface of the coating film. The probe is excited by two signals at the same time, the frequencies of the two signals are the same as the first-order intrinsic frequency and the second-order intrinsic frequency (i.e., denoted by $f_1$ and $f_2$ respectively) of the probe respectively, and the vibration amplitudes thereof are denoted by $A_1$ and $A_2$, respectively.

According to the system for simultaneously and microscopically measuring vapor cell coating film energy transfer and relaxation characteristics at nanometer scales, the atomic vapor cell cavity may be made of transparent quartz glass to enable laser enter and exit of the atomic vapor cell cavity for detection.

According to the system for simultaneously and microscopically measuring vapor cell coating film energy transfer and relaxation characteristics at nanometer scales, the energy transfer information and the collision elasticity information may be obtained through such a relationship, which may be between the first frequency shift signal and the second frequency shift signal ($\Delta f1$ and $\Delta f2$) and a distance between the probe and the coated samples.

Compared with the prior art, the embodiments have the beneficial effects in the following aspects.

Firstly, the system ingeniously combines the microscope micro-area detection for the atomic force with optical detection means, and two-dimensional characterization of spin polarizability of alkali metal atoms is carried out while collision energy transfer of the micro-area surface is detected, which realizes simultaneous and microscopic measurement of force and light in vapor cell coating film collision energy transfer and relaxation process at nanometer scales, so as to complete synchronous and corresponding measurement of the coating film surface state and the anti-relaxation characteristic micro-area characterization.

Secondly, integrated sealing and integration of a probe, a vapor cell coating film and alkali metal vapor are realized by designing and manufacturing the alkali-metal atomic vapor cell.

Thirdly, microscopic imaging of coating film morphology, energy transfer and relaxation time at nanometer scales is realized through a feedback-control resolving circuit for a distance between a high-precision probe and a sample; and high-sensitivity reading of energy detection is realized through a frequency offset conversion algorithm of the atomic force and the elastic energy via thermal compensation in high-precision three-dimensional scanning.

Figure 1:
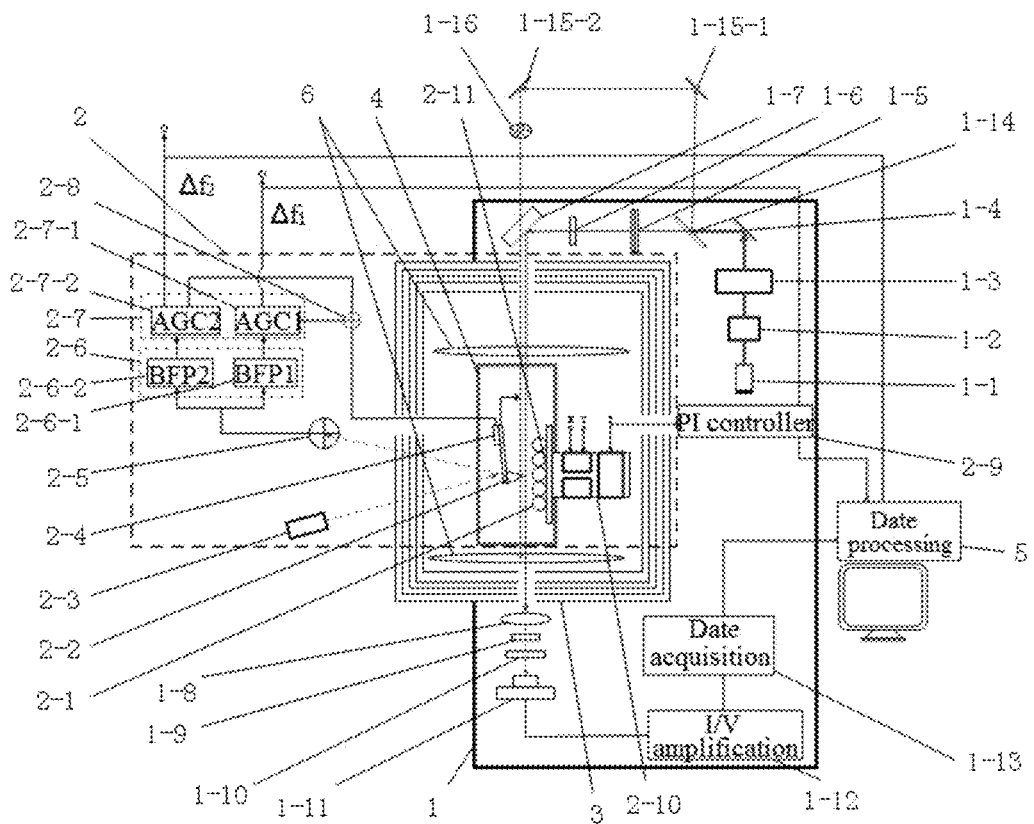
FIG. 1 is a schematic diagram of a system for simultaneously and microscopically measuring vapor cell coating film energy transfer and relaxation characteristics at nanometer scales.

List of the reference characters: 1 space relaxation characteristic detection unit; 2 atomic force microscope detection unit for energy transfer micro-areas; 3 shielding cylinder; 4 the coated alkali-metal atomic vapor cell; 5 data processing unit; 6 magnetic field controlled coil;

1-1 relaxation laser; 1-2 optical isolator; 1-3 spatial light filter; 1-4 reflector; 1-5 Glan-Taylor polarizer; 1-6 quarter-wave plate; 1-7 spatial light modulator; 1-8 focusing lens; 1-9 quarter-wave plate; 1-10 polarizing film; 1-11 PD detection unit; 1-12 I/V amplification unit; 1-13 data acquisition unit; 1-14 beam-splitting plate; 1-15-1 first pumping reflector; 1-15-2 second pumping reflector; 1-16 optical chopper;

2-1 coated sample; 2-2 probe; 2-3 laser; 2-4 oscillator; 2-5 four-quadrant photoelectric detection unit; 2-6 band-pass filter; 2-7 automatic gain controller; 2-8 adder; 2-9 PI controller; 2-10 piezoelectric scanning cylinder; 2-11 sample table; 2-6-1 first-order band-pass filter unit; 2-6-2 second-order band-pass filter unit; 2-7-1 first-order automatic gain controller; 2-7-2 second-order automatic gain controller;

4-1 top cover; 4-2 rubber inner ring; 4-3 transparent glass cover; 4-4 atomic vapor cell cavity; 4-5 gas outlet end; 4-6 gas inlet end; 4-7 rubber chamber bottom; 4-8 base; and 4-9 gas valve.

DETAILED DESCRIPTION OF THE EMBODIMENTS

The embodiment of the present disclosure is described in detail below, the embodiment is implemented on the premise of the technical scheme of the present disclosure, a detailed implementation mode and a specific operation process are given, but the protection scope of the present disclosure is not limited to the embodiment described below.

Referring to FIG. 1, the present disclosure provides a system for simultaneously and microscopically measuring quantum sensor coating film energy transfer and anti-relaxation characteristics at nanometer scales. The system includes a space relaxation characteristic detection unit 1, an atomic force microscope detection unit for energy transfer micro-areas 2, a shielding cylinder 3, a coated alkali-metal atomic vapor cell 4, a data processing unit 5 and a magnetic field controlled coils 6.

Figure 2:
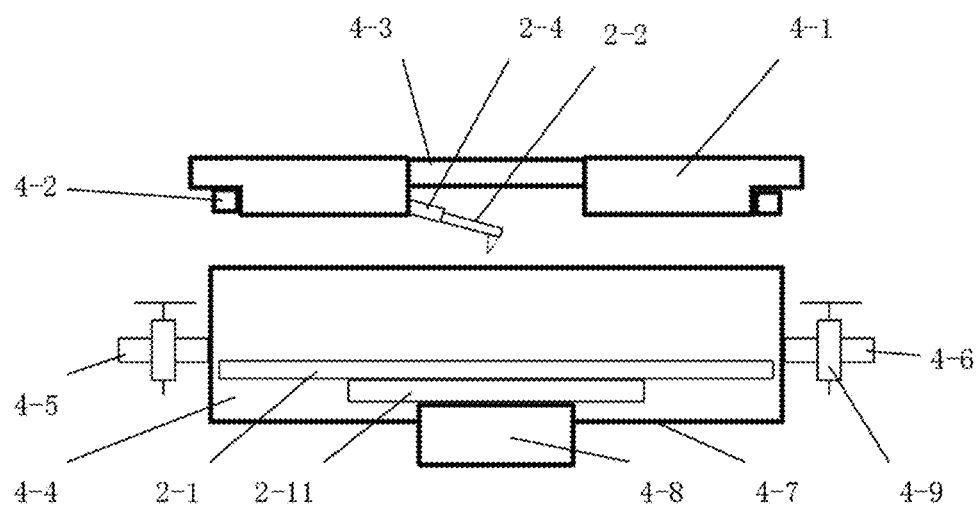
FIG. 2 is a schematic diagram of an alkali-metal atomic vapor cell in the open state.
Figure 3:
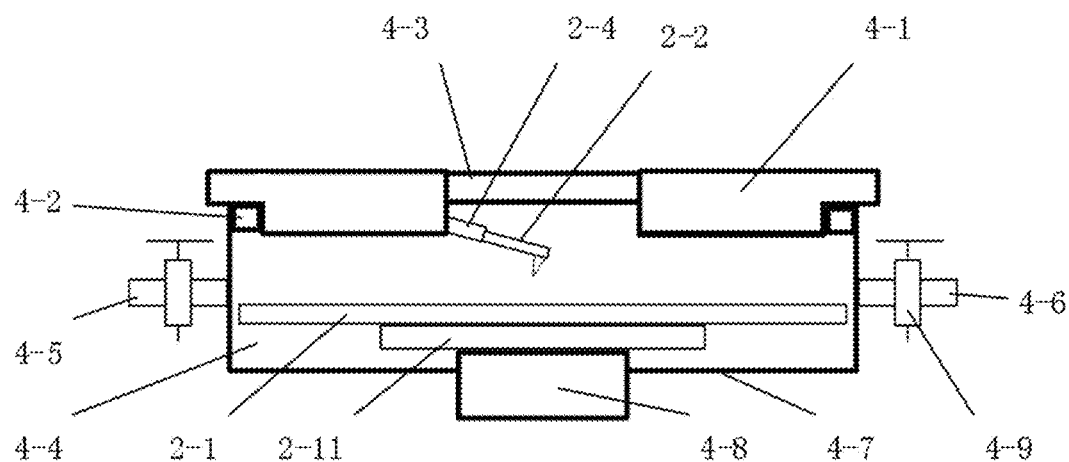
FIG. 3 is a schematic diagram of the alkali-metal atomic vapor cell in the closed state.

Referring to FIG. 2 and FIG. 3, the coated alkali-metal atomic vapor cell 4 includes a metal top cover 4-1, a rubber inner ring 4-2, a transparent glass cover 4-3, an atomic vapor cell cavity 4-4, a gas outlet end 4-5, a gas inlet end 4-6, a rubber chamber bottom 4-7, a base 4-8 and gas valves 4-9. An upper portion of the atomic vapor cell cavity 4-4 is covered with the metal top cover 4-1. The rubber chamber bottom 4-7 is located at a bottom of the atomic vapor cell cavity 4-4. The rubber inner ring 4-2 is arranged on an inner side of the metal top cover 4-1. The transparent glass cover 4-3 is arranged in a middle of the metal top cover 4-1. The gas outlet end 4-5 and the gas inlet end 4-6 are arranged on the atomic vapor cell cavity 4-4. The gas valves 4-9 are arranged on the gas outlet end 4-5 and the gas inlet end 4-6, respectively. The gas tightness of the vapor cell is enhanced by providing the rubber inner ring 4-2 on the metal top cover 4-1. The transparent glass cover 4-3 is configured for observing the vapor cell and allowing light to pass through the vapor cell to facilitate acquisition of laser signals. The probe 2-2 and the oscillator 2-4 are assembled in the vapor cell and are configured for scanning as well as input and output of the signals. The gas inlet end 4-6 and the gas outlet end 4-5 are arranged on the two sides of the atomic vapor cell cavity 4-4 respectively and configured for feeding and discharging gas. The gas valves 4-9 are configured for sealing the atomic vapor cell cavity. During measurement, the coated samples 2-1 are placed on the sample table 2-11, the whole chamber body is sealed in a vacuum mode, and a small amount of alkali metal served as an alkali metal gas source enters the cavity.

Figure 4:
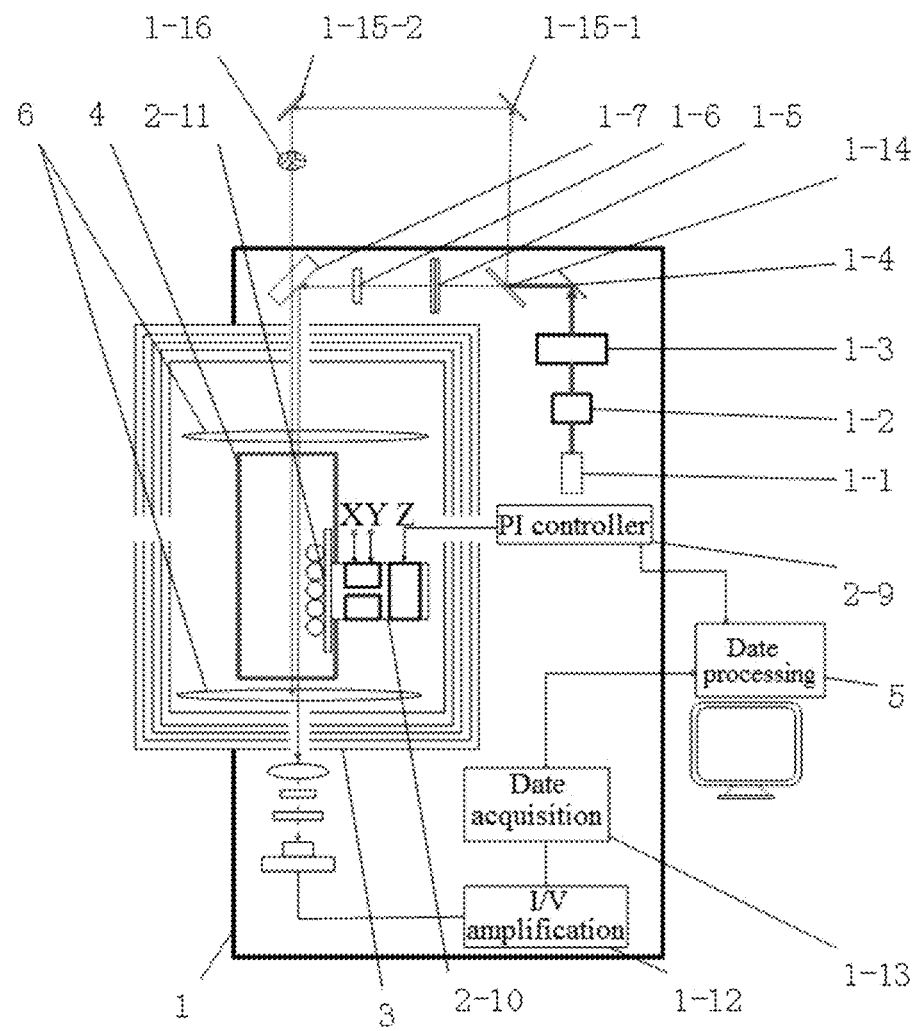
FIG. 4 is a schematic diagram of a space relaxation characteristic detection unit.

Referring to FIG. 4, the space relaxation characteristic detection unit 1 includes a relaxation laser 1-1, an optical isolator 1-2, a spatial light filter 1-3, a reflector 1-4, a Glan-Taylor polarizer 1-5, a quarter-wave plate 1-6, a spatial light modulator (DMD) 1-7, a focusing lens 1-8, a quarter-wave plate 1-9, a polarizing film 1-10, a PD detection unit 1-11, an I/V amplification unit 1-12, a data acquisition unit 1-13, a beam-splitting plate 1-14, pumping reflectors 1-15-1, 1-15-2 and an optical chopper 1-16. During detection, the coated alkali-metal atomic vapor cell 4 is arranged in the shielding cylinder 3, the magnetic field controlled coils 6 are configured to eliminate residual magnetism in the shielding cylinder 3. Alkaline metal gas and the coated samples are provided in the coated alkali-metal atomic vapor cell 4. A light beam emitted from the relaxation laser 1-1 is divided into two light paths by a beam-splitting plate 1-14 through the optical isolator 1-2, the spatial light filter 1-3 and the reflector 1-4. One path of the two light paths serves as pump light through the pumping reflectors 1-15-1, 1-15-12 and the optical chopper 1-16 and enters the coated alkali-metal atomic vapor cell 4 to excite alkali metal and generate spin polarization, and on and off the one path as the pump light path are controlled by controlling the optical chopper 1-16. After the pump light is cut off, the other path of the two light paths serves as detection light to be subjected to pretreatment through the Glan-Taylor polarizer 1-5, the quarter-wave plate 1-6 and the spatial light modulator 1-7, penetrates through the light-through hole in the shielding cylinder 3 and enters the coated alkali-metal atomic vapor cell 4. An outgoing light beam comes out of a light-through hole in the other side of the shielding cylinder 3 and sequentially passes through the focusing lens 1-8, the quarter-wave plate 1-9, the polarizing film 1-10 and the PD detection unit 1-11. Optical rotation information after a spin action of an alkali metal atom-coating is detected by the PD detection unit 1-11. The detection information is acquired by the I/V amplification unit 1-12 and the data acquisition unit 1-13 and record into the data processing unit 5. The relaxation time is calculated by the data processing unit 5.

Figure 5:
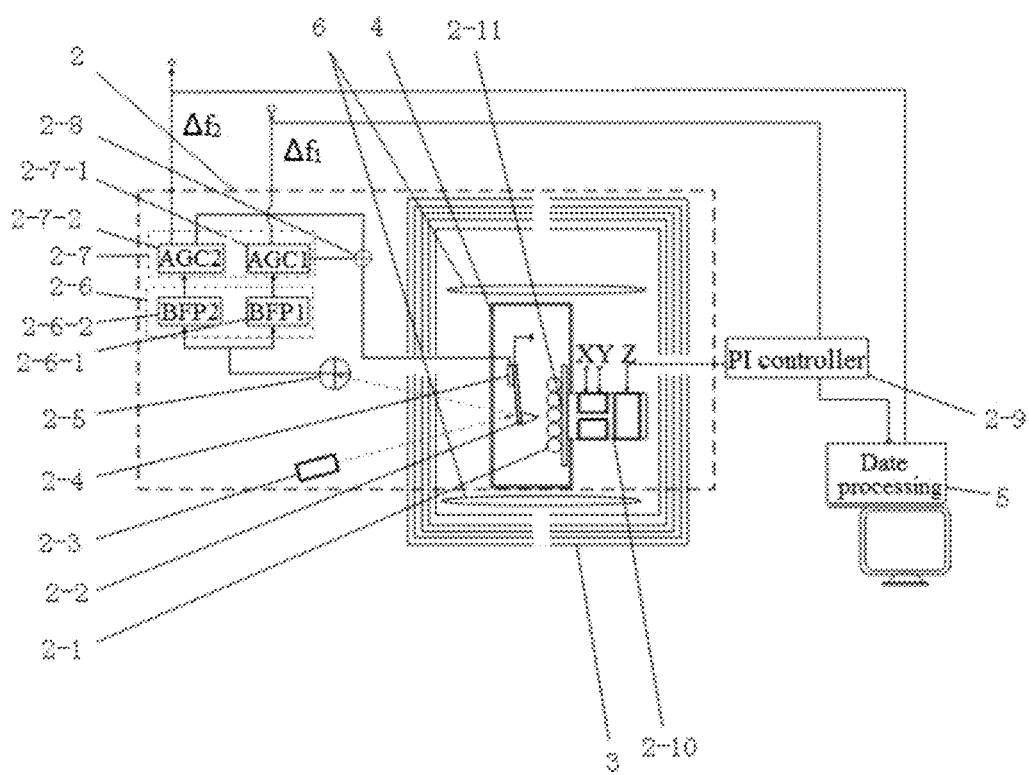
FIG. 5 is a schematic diagram of an atomic force microscope detection unit for energy transfer micro-areas.

Referring to FIG. 5, the atomic force microscope detection unit for energy transfer micro-areas 2 includes coated samples 2-1, a probe 2-2, a laser 2-3, an oscillator 2-4, a four-quadrant photoelectric detection unit 2-5, a band-pass filter unit (BPF) 2-6, an automatic gain controller (AGC) 2-7, an adder 2-8, a piezoelectric scanning cylinder 2-10, a sample table 2-11 and a PI controller (proportional integral controller) 2-9. The oscillator 2-4 is installed on an inner side of the metal top cover 4-1. The probe 2-2 is arranged at an end of the oscillator 2-4. The sample table 2-11 is installed on the rubber chamber bottom 4-7 in the atomic vapor cell. The piezoelectric scanning cylinder 2-10 is connected with one end of the base 4-8, the other end of the base 4-8 is connected with the rubber chamber bottom 4-7. The PI controller 2-9 is connected with the piezoelectric scanning cylinder 2-10. The band-pass filter unit (BPF) 2-6 includes a first-order band-pass filter unit 2-6-1 and a second-order band-pass filter unit 2-6-2. The automatic gain controller (AGC) 2-7 includes a first-order automatic gain controller 2-7-1 and a second-order automatic gain controller 2-7-2. The first-order band-pass filter unit 2-6-1 is connected with the first-order automatic gain controller 2-7-1. The second-order band-pass filter unit 2-6-2 is connected with the second-order automatic gain controller 2-7-2. The first-order automatic gain controller 2-7-1 is connected with the PI controller 2-9.

When the space relaxation characteristic detection unit 1 detects the space relaxation characteristic, the probe 2-2 is excited by dual-frequency modulation signals with first-order and second-order eigen frequencies (i.e., denoted by $f_1$ and $f_2$ respectively) to measure the surface of the coated samples 2-1. Laser emitted by the laser 2-3 irradiates the probe 2-2 through the transparent glass cover 4-3. Reflected laser is received by the four-quadrant detection unit 2-5, namely, the vibration information of the probe 2-2 is received by the four-quadrant detection unit 2-5. The vibration information of the probe 2-2 includes first-order detection information with the frequency $f_1$ and second-order detection information with the frequency $f_2$. The first-order detection information and the second-order detection information respectively pass through the first-order band-pass filter unit 2-6-1 and the second-order band-pass filter unit 2-6-2. A second-order detection signal passes through the second-order automatic gain controller 2-7-2 to obtain two signals. One of the two signals obtains frequency shift signal $\Delta f_2$ related to collision, and the frequency shift signal $\Delta f_2$ is processed by the data processing unit 5 to obtain energy transfer information. First-order detection signal pass through a first-order automatic gain controller 2-7-1 to obtain two signals. One of the two signals is frequency shift signal $\Delta f_1$ and is record into the piezoelectric scanning cylinder 2-10 as a feedback signal after passing through the PI controller 2-9. The PI controller 2-9 controls the piezoelectric scanning cylinder 2-10 to move. The base 4-8 moves along with the piezoelectric scanning cylinder. The base 4-8 drives the sample table to move. The probe is close to or away from the coated samples through the movement of the sample table. The collision elasticity information of the probe and the sample can be obtained through the frequency shift signal $\Delta f_1$. The other signal of the second-order automatic gain controller 2-7-2 are served as a feedback signal and the other feedback signal of the first-order automatic gain controller 2-7-1 are added in the adder 2-8 and fed back to the probe oscillator 2-4 to be served as a probe excitation signal.

Although the embodiments of the present disclosure have already been illustrated and described, various changes, modifications, replacements and transformations can be made by those skilled in the art under the condition of without departing from the principle and the spirit of the present disclosure, and thus the scope of the present disclosure should be restricted by claims and equivalents thereof.

What is claimed is:

1. A system for simultaneously and microscopically measuring vapor cell coating film energy transfer and relaxation characteristics at nanometer scales, the system comprising a space relaxation characteristic detection unit (1), a shielding cylinder (3), an coated alkali-metal atomic vapor cell (4), a data processing unit (5) and magnetic field controlled coils (6), wherein the space relaxation characteristic detection unit (1) comprises a relaxation laser (1-1), an optical isolator (2), a spatial light filter (1-3), a reflector (1-4), a Glan-Taylor polarizer (1-5), a first quarter-wave plate (1-6), a spatial light modulator (1-7), a focusing lens (1-8), a second quarter-wave plate (1-9), a polarizing film (1-10), a PD detection unit (1-11), an I/V amplification unit (1-12), a data acquisition unit (1-13), a beam-splitting plate (1-14), pumping reflectors and an optical chopper (1-16); the coated alkali-metal atomic vapor cell (4) and the magnetic field controlled coils (6) are arranged in the shielding cylinder (3), the magnetic field controlled coils (6) are configured to eliminate residual magnetism in the shielding cylinder (3), alkaline metal gas and coated samples are provided in the coated alkali-metal atomic vapor cell (4), a light beam emitted from the relaxation laser (1-1) is divided into two light paths by the beam-splitting plate (1-14) through the optical isolator (1-2), the spatial light filter (1-3) and the reflector (1-4), one path of the two light paths serves as pump light to penetrate through a first light-through hole in the shielding cylinder (3) after passing through the pumping reflectors and the optical chopper (1-16) and enters the coated alkali-metal atomic vapor cell (4) to excite alkali metal and generate spin polarization; on and off of the one path as the pump light are controlled by controlling the optical chopper (1-16); after the pump light is cut off, the other path of the two light paths serves as detection light to be subjected to pretreatment through the Glan-Taylor polarizer (1-5), the first quarter-wave plate (1-6) and the spatial light modulator (1-7), penetrates through the first light-through hole in the shielding cylinder (3) and enters the coated alkali-metal atomic vapor cell (4); an outgoing light beam comes out of a second light-through hole in the other side of the shielding cylinder (3) and sequentially passes through the focusing lens (1-8), the second quarter-wave plate (1-9), the polarizing film (1-10) and the PD detection unit (1-11); spin relaxation information of alkali-metal atoms near the coating surface is detected by the PD detection unit (1-11); the spin relaxation information is acquired by the I/V amplification unit (1-12) and the data acquisition unit (1-13) and input into the data processing unit (5); and relaxation time is calculated by the data processing unit (5).

2. The system for simultaneously and microscopically measuring vapor cell coating film energy transfer and relaxation characteristics at nanometer scales according to claim 1, wherein the coated alkali-metal atomic vapor cell (4) comprises a top cover (4-1), an atomic vapor cell cavity (4-4), a gas outlet end (4-5), a gas inlet end (4-6), a rubber chamber bottom (4-7) and gas valves (4-9); an upper portion of the atomic vapor cell cavity (4-4) is covered with the top cover (4-1), the rubber chamber bottom (4-7) is located at a bottom of the atomic vapor cell cavity (4-4), the gas outlet end (4-5) and the gas inlet end (4-6) are arranged on the atomic vapor cell cavity (4-4), and the gas valves (4-9) are arranged on the gas outlet end (4-5) and the gas inlet end (4-6), respectively; the gas inlet end (4-6) and the gas outlet end (4-5) are configured for feeding and discharging the alkaline metal gas; and the gas valves (4-9) are configured for sealing the atomic vapor cell cavity.

3. The system for simultaneously and microscopically measuring vapor cell coating film energy transfer and relaxation characteristics at nanometer scales according to claim 2, wherein a rubber inner ring (4-2) is arranged on an inner periphery of the top cover (4-1), and the rubber inner ring (4-2) of the top cover (4-1) is configured to enhance gas tightness of the atomic vapor cell cavity (4-4).

4. The system for simultaneously and microscopically measuring vapor cell coating film energy transfer and relaxation characteristics at nanometer scales according to claim 2, wherein the atomic vapor cell cavity (4-4) is made of transparent quartz glass to enable laser enter and exit of the atomic vapor cell cavity for detection.

5. The system for simultaneously and microscopically measuring vapor cell coating film energy transfer and relaxation characteristics at nanometer scales according to claim 3, the system further comprising an atomic force microscope detection unit for energy transfer micro-areas (2), wherein the atomic force microscope detection unit for energy transfer micro-areas (2) comprises a probe (2-2), a laser (2-3), an oscillator (2-4), a four-quadrant photoelectric detection unit (2-5), a band-pass filter unit (2-6), an automatic gain controller (2-7), an adder (2-8), a piezoelectric scanning cylinder (2-10), a sample table (2-11) and a PI controller (2-9); the coated alkali-metal atomic vapor cell (4) further comprises a base (4-8), and a transparent glass cover (4-3) is arranged in a middle of the top cover (4-1); the oscillator (2-4) is installed on an inner side of the top cover (4-1), the probe (2-2) is arranged at an end of the oscillator (2-4), the sample table (2-11) is installed on the rubber chamber bottom (4-7) in the coated alkali-metal atomic vapor cell, the coated samples (2-1) are placed on the sample table (2-11), the piezoelectric scanning cylinder (2-10) is connected with one end of the base (4-8), the other end of the base (4-8) is connected with the rubber chamber bottom (4-7), and the PI controller (2-9) is connected with the piezoelectric scanning cylinder (2-10) located in the shielding cylinder through a wiring hole in the shielding cylinder; the band-pass filter unit (2-6) comprises a first-order band-pass filter unit (2-6-1) and a second-order band-pass filter unit (2-6-2), the automatic gain controller (2-7) comprises a first-order automatic gain controller (2-7-1) and a second-order automatic gain controller (2-7-2), the four-quadrant detection unit (2-5) is connected with the band-pass filter unit (2-6), the first-order band-pass filter unit (2-6-1) is connected with the first-order automatic gain controller (2-7-1), the second-order band-pass filter unit (2-6-2) is connected with the second-order automatic gain controller (2-7-2), and the first-order automatic gain controller (2-7-1) is connected with the PI controller (2-9); the first-order automatic gain controller (2-7-1) and the second-order automatic gain controller (2-7-2) are also connected with the adder (2-8), and the adder (2-8) is connected with the oscillator (2-4) through another wiring hole in the shielding cylinder; laser emitted by the laser (2-3) irradiates a back face of the probe (2-2) through the another wiring hole in the shielding cylinder and the transparent glass cover (4-3) and reaches the four-quadrant photoelectric detection unit (2-5) after being reflected, vibration information of the probe (2-2) is collected by the four-quadrant photoelectric detection unit (2-5) and comprises first-order detection information with frequency ($f_1$) and second-order detection information with frequency ($f_2$), the first-order detection information and the second-order detection information respectively pass through the first-order band-pass filter unit (2-6-1) and the second-order band-pass filter unit (2-6-2), a second-order detection signal passes through the second-order automatic gain controller (2-7-2) to obtain first two signals, one of the first two signals obtains a first frequency shift signal ($\Delta f_2$) related to collision, and the first frequency shift signal ($\Delta f_2$) is processed by the data processing unit (5) to obtain energy transfer information; a first-order detection signal passes through a first-order automatic gain controller (2-7-1) to obtain second two signals, one of the second two signals is a second frequency shift signal ($\Delta f_1$) and is input into the piezoelectric scanning cylinder (2-10) as a feedback signal after passing through the PI controller (2-9), the PI controller (2-9) controls the piezoelectric scanning cylinder (2-10) to move, the base (4-8) moves along with the piezoelectric scanning cylinder, the base (4-8) drives the sample table to move, and the probe is close to or away from the coated samples through a movement of the sample table, and collision elasticity information of the probe and the coated samples is obtained through the second frequency shift signal ($\Delta f_1$); the first signal of the two signals of the second-order automatic gain controller (2-7-2) served as a first feedback signal and the second signal of the two signals of the first-order automatic gain controller (2-7-1) served as a second feedback signal are added in the adder (2-8) and fed back to the probe oscillator (2-4) to be served as a probe excitation signal; and the probe (2-2) is excited to vibrate through the oscillator (2-4), the coated samples (2-1) are scanned, and surface topography information and energy transfer information are obtained.

6. The system for simultaneously and microscopically measuring vapor cell coating film energy transfer and relaxation characteristics at nanometer scales according to claim 3, wherein the atomic vapor cell cavity (4-4) is made of transparent quartz glass to enable laser enter and exit of the atomic vapor cell cavity for detection.

7. The system for simultaneously and microscopically measuring vapor cell coating film energy transfer and relaxation characteristics at nanometer scales according to claim 5, wherein the energy transfer information and the collision elasticity information are obtained through such a relationship, which is between the first frequency shift signal and the second frequency shift signal and a distance between the probe and the coated samples.

8. The system for simultaneously and microscopically measuring vapor cell coating film energy transfer and relaxation characteristics at nanometer scales according to claim 5, wherein the atomic vapor cell cavity (4-4) is made of transparent quartz glass to enable laser enter and exit of the atomic vapor cell cavity for detection.

* * * * *